United States Patent [19]
Caridi et al.

[11] Patent Number: 6,028,685
[45] Date of Patent: Feb. 22, 2000

[54] INTERLEAVED BROADCAST TECHNIQUES FOR WAVELENGTH DIVISION MULTIPLEXED SYSTEMS

[75] Inventors: Elisa A. Caridi; Jason Blain Stark, both of Holmdel, N.J.

[73] Assignee: Lucent Technologies Inc., Murray Hill, N.J.

[21] Appl. No.: 08/937,673

[22] Filed: Sep. 25, 1997

[51] Int. Cl.[7] .............................. H04J 4/00; H04J 14/02; H04J 14/08

[52] U.S. Cl. ......................... 359/123; 359/123; 359/127; 359/140

[58] Field of Search ................................... 359/123, 127, 359/140

[56] References Cited

U.S. PATENT DOCUMENTS 5,861,965  1/1999  Koren et al. .............................. 359/123
5,896,212  4/1999  Sotom et al. ............................. 359/125

*Primary Examiner*—Jason Chan
*Assistant Examiner*—Mohammad Sedighian
*Attorney, Agent, or Firm*—Jeffrey J. Brosemer

[57] ABSTRACT

Providing a common broadcast channel in a WDM (wavelength division multiplexed) system is accomplished by applying a pulsed light source to a dispersive delay line, and also applying the light source to each of M delay lines, such that the Mth delay line has a delay of (M−1) time slots, where M is a nonnegative integer representing the number of time slots to be provided for the broadcast channel. The dispersive delay line spreads the spectrum of the pulsed light source across the desired bandwidth of the WDM system to provide a wide-spectrum signal, and this wide-spectrum signal may then be modulated to provide a plurality of WDM channels. The M delay lines provide delayed pulses that may be modulated to provide a common broadcast channel for reception on a plurality of WDM receivers.

13 Claims, 1 Drawing Sheet

INTERLEAVED BROADCAST TECHNIQUES FOR WAVELENGTH DIVISION MULTIPLEXED SYSTEMS

BACKGROUND OF THE INVENTION

1. Field of the Invention

The invention relates generally to optical communications, and more particularly to wavelength division multiplexed systems.

2. Description of the Related Art

At present, wavelength division multiplexed (WDM) optical communications systems are experiencing ever-increasing popularity. Such systems are especially useful where it is desired to selectively deliver a plurality of information channels to a plurality of customers using a single transmission medium. For example, a first set of services is assigned to a first frequency bandwidth, whereas a second set of services is assigned to a second frequency bandwidth. Both frequency bandwidths are transmitted over a single fiber optic cable. Customers subscribing to the first set of services are provided with receivers responsive to the first frequency bandwidth, customers subscribing to the second set of services are provided with receivers responsive to the second frequency bandwidth, and customers subscribing to both sets of services are provided with receivers responsive to both frequency bandwidths.

WDM systems present problems when it is desired to send a common information channel to all customers. Hereinafter, this common information channel will be referred to as a broadcast channel, and it may be employed to carry virtually any type of broadcast signal which is to be sent to all customer receivers. In WDM system operation, not all customers subscribe to the same sets of channels, and, therefore, not all customer receivers are enabled to receive the same frequency bandwidth. Accordingly, there are several possible approaches for sending broadcasting information to all customer receivers. For example, the broadcast signal may be copied and translated to each of the frequency bandwidths for which receivers are to be employed, which is sometimes referred to as an overlay scheme. Unfortunately, a portion of the bandwidth that would otherwise be available for non-broadcast or other such services is now allocated to the broadcast channel. Moreover, this approach is quite inefficient, as the exact same information is transmitted at a plurality of different frequency ranges, effectively wasting the available bandwidth of the transmission medium.

It is possible to utilize an alternate approach whereby a fixed frequency bandwidth is allocated to the broadcast channel. In this case, all receivers must be designed to receive this fixed-frequency broadcast channel, as well as the frequency band providing the desired set of services mentioned above. Although the bandwidth of the transmission medium is conserved relative to the overlay scheme, this is accomplished at the expense of added receiver complexity. This shortcoming is exacerbated because, for each transmitter in a WDM system, there are typically many receivers in use. The increased cost of manufacturing a two-frequency-band receiver is therefore multiplied by the relatively high number of receivers required in a given system. In addition, one must now construct a WDM routing device that is capable of routing not just one, but two different frequency bandwidths, to each receiver. Such a WDM routing device is undesirably expensive and complex. What is needed is an improved technique for providing a broadcast channel to a plurality of WDM receivers.

SUMMARY OF THE INVENTION

Providing a common broadcast channel to a plurality of receivers of a WDM (wavelength division multiplexed) system is accomplished by applying a pulsed light source to a dispersive delay line, and also applying the light source to each of M delay lines, such that the Mth delay line has a delay of (M−1) bits, where M is a nonnegative integer representing the number of time slots to be provided for the broadcast channel. The dispersive delay line spreads the spectrum of the pulsed light source across the desired bandwidth of the WDM system to provide a wide-spectrum signal, and this wide-spectrum signal may then be modulated to provide a plurality of WDM channels. The M delay lines provide delayed pulses that may be modulated to provide a common broadcast channel for reception on a plurality of WDM receivers. In this manner, a single light source provides a common broadcast channel interleaved with a plurality of WDM channels.

According to one preferred embodiment, the pulsed light source is fed to a 1×(M+1) splitter. Each of respective M output ports of the splitter are coupled to corresponding ones of M delay lines, the Mth delay line having a delay of (M−1) time slots, and the (M+1)th output port of the splitter is coupled to the dispersive delay line. The outputs of the M delay lines and the dispersive delay line are combined using an (M+1)×(M+1) combiner to provide a composite signal. The composite signal may be applied to a modulator to provide a plurality of WDM channels and a common broadcast channel.

DETAILED DESCRIPTION OF THE PREFERRED EMBODIMENTS

Figure 1:
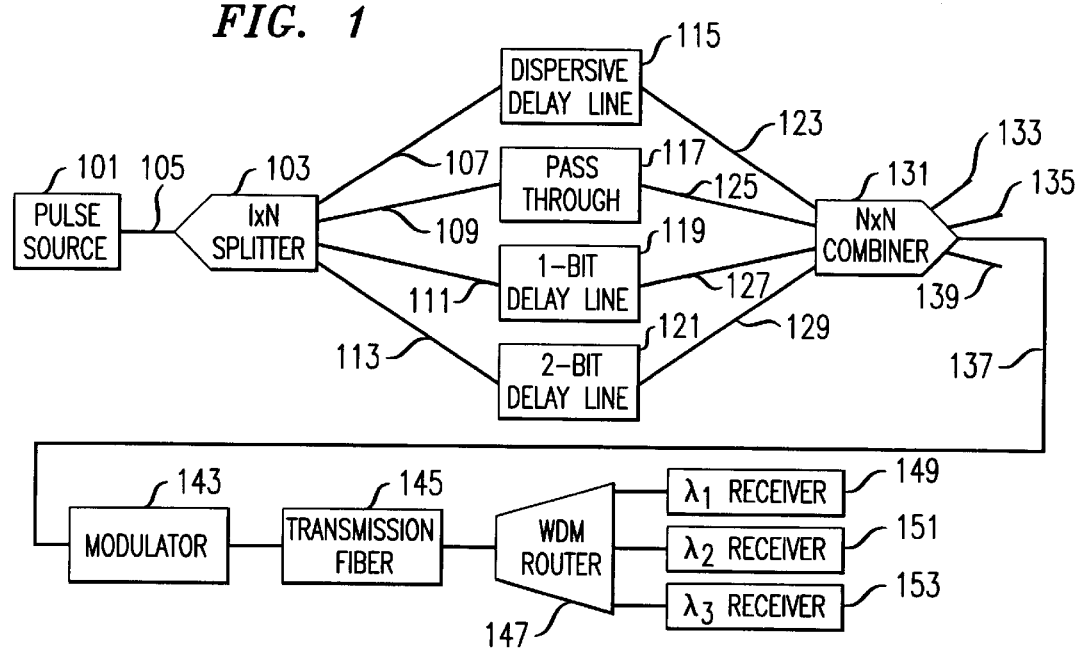
FIG. 1 is a hardware block diagram showing a WDM system equipped to provide a common broadcast channel to a plurality of WDM receivers.

Refer to FIG. 1, which is a hardware block diagram showing a WDM system equipped to provide a common broadcast channel to a plurality of WDM receivers. Pulsed source 101 generates broadband optical pulses. These pulses are sufficiently broadbanded so as to include frequency components across the entire operational bandwidth of the WDM system. The pulsed source 101 is coupled to an input port 105 of a 1×N splitter 103. A first output port 107 of the 1×N splitter 103 is coupled to a dispersive delay line 115, a second output port 109 of the 1×N splitter 103 is coupled to a pass-through 117 device, a third output port 111 of the 1×N splitter is coupled to a 1-bit delay line 119, and a fourth output port 113 of the 1×N splitter is coupled to a 2-bit delay line 121.

Dispersive delay line 115 may be implemented, for example, using a length of dispersive fiber optic cable. The dispersive delay line 115 disperses optical pulses in the time domain so as to distribute the frequency spectrum of the pulses across a time span that is greater than the duration of an individual pulse. Each optical pulse is chirped such that the instantaneous frequency of the chirped pulse varies as a function of time. Illustratively, the dispersive delay line varies the instantaneous frequency of the chirped pulse as a substantially linear function of time.

Pass-through 117 represents an optically transmissive medium such as, for example, a section of nondispersive fiber optic cable. The length of this cable should provide no more than an insignificant amount of propagational delay. 1-bit delay line 119 can be implemented using a length of nondispersive fiber optic cable sufficiently long so as to provide a propagational delay of one bit period. However, any of various other well-known devices for providing a propagational delay may also be employed for 1-bit delay line 119. In a similar manner, 2-bit delay line 121 may be implemented using a length of nondispersive fiber optic cable sufficiently long so as to provide a propagational delay of two bit periods. However, as in the case of one-bit delay line 119, the two-bit delay line 121 need not be fabricated from a section of fiber optic cable, as any of various other propagational delay devices may be employed.

The output ports of dispersive delay line 115, pass-through 117, 1-bit delay line 119, and 2-bit delay line 121 are combined using an N×N combiner 131. FIG. 1 shows the use of an N×N combiner 131 for the sake of convenience, because such combiners are widely available, and also to provide multiple outputs, some or all of which may be applied to a corresponding modulator and used to generate modulated WDM channels. However, an N×N combiner is not strictly required, as any combiner could be employed for combiner 131, so long as the combiner has N or more input ports and at least one output port. In the illustrative example of FIG. 1, the output of dispersive delay line 115 is fed to a first input port 123 of N×N combiner 131, the output of pass-through 117 is fed to a second input port 125 of N×N combiner 131, the output of 1-bit delay line 119 is fed to a third input port 127 of N×N combiner 131, and the output of 2-bit delay line 121 is fed to a fourth input port 129 of N×N combiner 131.

Output port 137 of combiner 131 is fed to a modulator 143. Note that output port 133 of combiner 131 could, but need not, be fed to a modulator, and that any of the remaining output ports 135, 139 of combiner 131 could, but need not, be fed to a modulator. Modulator 143 modulates optical energy received from N×N combiner 131 with information corresponding to one or more WDM channels. These channels may be arranged into groups, or bands, according to wavelength, such that respective channel groups are received by corresponding receivers equipped to receive that particular band. Each of these groups, or bands, of channels may be conceptualized as corresponding to a certain color of light, such that a given WDM receiver is equipped to receive WDM channels of a certain color.

The output of modulator 143 is coupled to a length of transmission fiber 145 which is used to convey the modulated WDM channels to a distribution location proximate to the subscriber premises. Illustratively, if the WDM channels represent various types of cable television programming, the transmission fiber 145 is used to convey the WDM channels from the cable headend unit to convenient distribution locations located proximate to customers' homes. The end of transmission fiber 145 opposite modulator 143 is coupled to a WDM router 147 which routes particular bands or groups of WDM channels on transmission fiber 145 to corresponding WDM receivers. For example, a first WDM receiver, $\lambda_1$ receiver 149, is equipped to respond to a first group, or band, of channels at and near wavelength $\lambda_1$. Accordingly, $\lambda_1$ receiver 149 may be conceptualized as responding to WDM channels of a certain color of light, such as, for example, red. A second WDM receiver, $\lambda_2$ receiver 151, is equipped to respond to a second group, or band, of channels at and near wavelength $\lambda_2$. Accordingly, $\lambda_2$ receiver 151 may be conceptualized as responding to WDM channels of a certain color of light, such as, for example, green. A third WDM receiver, $\lambda_3$ receiver 153, is equipped to respond to a third group, or band, of channels at and near wavelength $\lambda_3$. Accordingly, $\lambda_3$ receiver 153 may be conceptualized as responding to WDM channels of a certain color of light, such as, for example, blue.

The output of dispersive delay line 115 is light with a time-varying wavelength. When this light is coupled through N×N combiner 131 to modulator 143, data are encoded sequentially onto each individual wavelength channel. In this manner, a time-domain signal at the modulator input is converted into a wavelength-domain signal at the modulator 143 output, which is then distributed, demultiplexed, and delivered to each customer or subscriber. In one embodiment of the bit-interleaved broadcast transmitter of FIG. 1, a short broadband optical pulse generated by pulsed source 101 is chirped in dispersive delay line 115 to produce light having a wavelength that varies linearly with time for each pulse received at the input of dispersive delay line 115. Successive bit periods at the modulator correspond to a linearly varying wavelength.

Broadcast channel capabilities may be incorporated into the chirped-pulse WDM system described in the preceding paragraph. The short broadband pulse generated by pulsed source 101 is delivered to an 1:N power splitter, i.e., 1×N splitter 103, to generate N copies of the pulsed output. One of these copies is chirped in dispersive delay line 115. Each of the other N−1 copies are delayed by successive 1-bit periods. The outputs of all of the delay lines are then combined into an N:N power combiner, i.e., N×N combiner 131. The result is N copies of a signal consisting of a period of chirped light, followed by N−1 pulses of broadband light. Upon delivery to modulator 143, wavelength channels are produced from the chirped portion, while data applied to the broadband pulses are applied to all wavelength channels simultaneously. In this manner, broadcast and switched digital services can all be delivered using the same light source.

Figure 2:
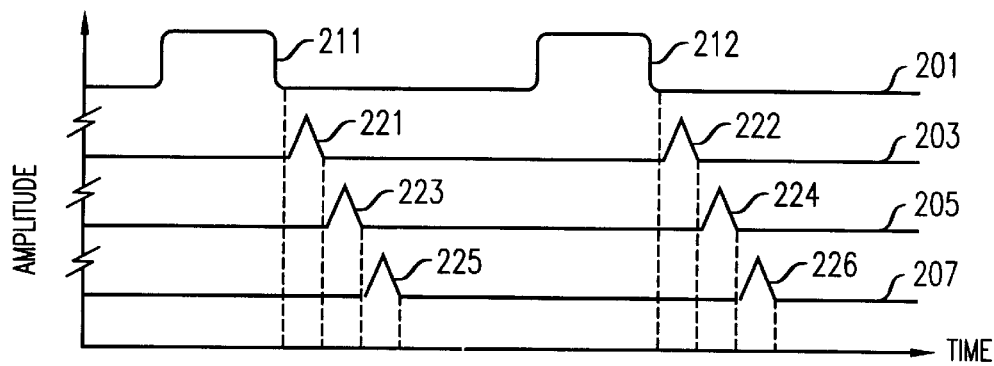
FIG. 2 is a graph of amplitude versus time for waveforms that are processed by the system of FIG. 1.

The operation of the hardware configuration of FIG. 1 may be better understood with reference to FIG. 2, which depicts a graph of amplitude versus time for waveforms that are processed by the system of FIG. 1. Pulsed source 101 generates broadband optical pulses of the form shown, for example, as pulse 221 (FIG. 2). The 1×N splitter couples the optical pulse to first, second, third, and fourth output ports 107, 109, 111, and 113. From the first output port 107, the pulse encounters dispersive delay line 115, which in the example of FIG. 1, applies a wavelength-dependent dispersion to the pulse which is a linear function of wavelength, such that the instantaneous frequency at the output of the dispersive delay line 115 varies substantially linearly as a function of time.

The waveform at the output of dispersive delay line 115 is depicted in FIG. 2 as waveform 201. The substantially flat peaks of waveforms 211 and 212 show that the dispersive delay line 115 has a relatively flat frequency response across the entire spectral bandwidth of the pulse generated by pulsed source 101. Note that the time difference between the lowest-frequency and highest-frequency components of the pulse at the output of the dispersive delay line 115 is generally greater than the duration of the pulse generated by pulsed source. For illustrative purposes, the leading edge of each waveform 211, 212 may be conceptualized as representing the highest-frequency components of the pulsed source 101 (FIG. 1), whereas the trailing edge of each waveform 211, 212 (FIG. 2) may be conceptualized as representing the lowest-frequency components of the pulsed source. Waveforms 211, 212 may subsequently be modulated to provide a plurality of WDM channels.

The second output port of the 1×N splitter 109 (FIG. 1) is fed to pass-through 117, and the output of pass-through 117 is shown as waveform 207 (FIG. 2). Pulses 225 and 226 represent reduced-amplitude, temporally simultaneous versions of the pulses generated by pulsed source 101 (FIG. 1). Waveform 205 (FIG. 2) represents the output of 1-bit delay line 119. Note that pulse 223 is delayed by one bit period relative to pulse 225, and that pulse 224 is delayed by one bit period relative to pulse 226. Waveform 203 represents the output of 2-bit delay line 121. Note that pulse 221 is delayed by two bit periods relative to pulse 225, and that pulse 222 is delayed by two bit periods relative to pulse 226. Pulses 221, 222, 223, 224, 225, and 226 may be subsequently modulated to provide a common broadcast channel to all WDM receivers. The input to modulator 143 is the sum of waveforms 201, 203, 205, and 207.

Figure 3:
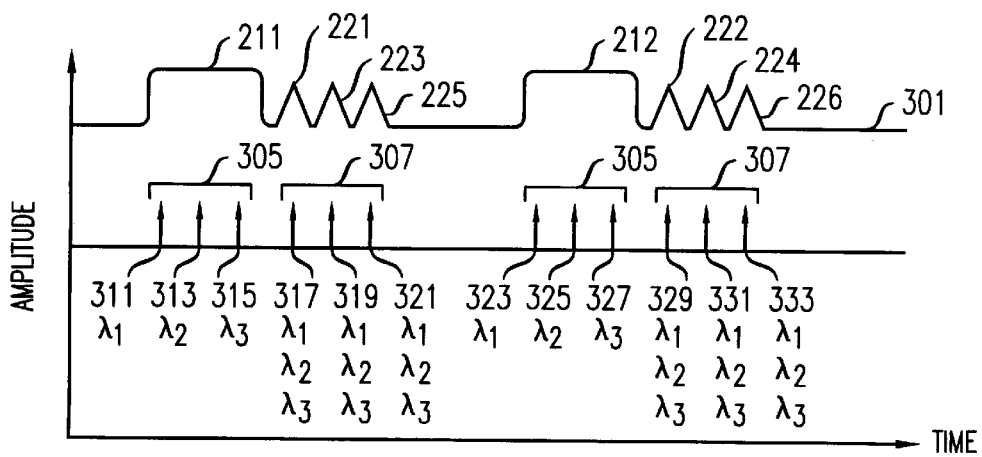
FIG. 3 is a graph showing frequency components for the waveforms of FIG. 2.

The sum of waveforms 201, 203, 205, and 207 is better illustrated in FIG. 3, which not only shows the sum of these waveforms, but also the frequency components corresponding to the summed waveforms. Summed waveform 301 is comprised of waveform 211, pulses 221, 223, 225, waveform 212, and pulses 222, 224, and 226. In the frequency domain, waveform 211 consists of a timed sequence of frequency components 311, 313, 315. First, frequency component 311 at $\lambda_1$ appears, followed by frequency component 313 at $\lambda_2$, and then frequency component 315 at $\lambda_3$. Each of these frequency components can be independently modulated to provide a given WDM channel in a WDM system. Similarly, in the frequency domain, waveform 212 consists of a timed sequence of frequency components 323, 325, 327. First, frequency component 323 at $\lambda_1$ appears, followed by frequency component 325 at $\lambda_2$, and then frequency component 327 at $\lambda_3$. Frequency components 311, 313, 315, 323, 325, and 327 are used to provide WDM channels 305. Components 311 and 323 may be modulated to provide a first WDM channel at $\lambda_1$ components 313 and 325 provide a second channel at $\lambda_2$, and components 315 and 327 provide a third channel at $\lambda_3$ In the frequency domain, pulse 221 consists of a simultaneous combination of frequency components at all wavelengths, shown as frequency component 317 containing components at $\lambda_1$, $\lambda_2$, and $\lambda_3$. In a similar manner, pulse 223 consists of a simultaneous combination of frequency components at all wavelengths, shown as frequency component 319 containing components at $\lambda_1$, $\lambda_2$, and $\lambda_3$; pulse 225 has frequency component 321, pulse 222 has frequency component 329, pulse 224 has frequency component 331, and pulse 226 has frequency component 333. Since each pulse 221, 223, 225, 222, 224, and 226 contains frequency components at all frequencies, these pulses can be modulated to provide a common broadcast channel 307 for receivers in a WDM system.

It should be understood that FIG. 1 utilizes one-bit and two-bit delay lines 119, 121 to provide waveforms 203, 205 (FIG. 2) for illustrative purposes, and that any number of delay lines could be employed to provide any number of bit-delayed waveforms. For example, it is possible to construct a system that has only a pass-through 117, but no delay lines. It is also possible to provide a system having only a 1-bit delay line 119, but no 2-bit delay line 121, or a system having only a 2-bit delay line 121, but no 1-bit delay line 119, or a system having 1-, 2- and 3-bit delay lines, or a system having 1- and 3-bit delay lines, but no 2-bit delay lines. The foregoing examples have been provided for illustrative purposes only, and not to limit the scope of the claimed invention.

We claim:

1. A method of providing a common broadcast channel in a wavelength division multiplexed (WDM) system, the method comprising the steps of:
   (a) applying output signals from a pulsed light source to a dispersive delay line to generate a wide-spectrum signal for providing a plurality of WDM channels, and
   (b) applying output signals from the pulsed light source to M delay lines, such that the Mth delay line has a delay of (M−1) bits, where M is a nonnegative integer representing the number of bits to be provided for the broadcast channel, the M delay lines generating delayed pulses for providing the common broadcast channel.

2. A method of using one pulsed light source to provide a common broadcast channel and a plurality of WDM channels, the method comprising the steps of:
   (a) applying output signals from the pulsed light source to a dispersive delay line to generate a wide-spectrum signal for providing the plurality of WDM channels, and
   (b) applying output signals from the pulsed light source to M delay lines, such that the Mth delay line has a delay of (M−1) bits, where M is a nonnegative integer representing the number of bits to be provided for the broadcast channel, the M delay lines generating delayed pulses for providing a common broadcast channel.

3. The method of claim 1 wherein steps (a) and (b) are performed by coupling the pulsed light source to a 1×(M+1) splitter, and coupling each of respective M output ports of the splitter to corresponding ones of M delay lines, the Mth delay line having a delay of (M−1) time slots, the (M+1)th output port of the splitter being coupled to the dispersive delay line.

4. The method of claim 3 further including the step of combining the outputs of the M delay lines and the dispersive delay line using an (M+1)×(M+1) combiner to provide a composite signal.

5. The method of claim 4 further including the step of applying the composite signal to a modulator to provide a plurality of WDM channels and a common broadcast channel.

6. The method of claim 5 wherein the plurality of WDM channels are provided from the output of the dispersive delay line and the common broadcast channel is provided by combining the outputs of the M delay lines.

7. A transmitter for providing a common broadcast channel for a wavelength division multiplexed (WDM) system comprising:
   (a) a pulsed light source;
   (b) a dispersive delay line coupled to the pulsed light source for generating a wide-spectrum signal from the pulsed light source for providing a plurality of WDM channels, and
   (c) M delay lines, each coupled to the pulsed light source, the Mth delay line having a delay of (M−1) time slots, wherein M is a nonnegative integer representing a number of time slots to be provided for the common broadcast channel, the M delay lines generating delayed pulses for providing a common broadcast channel.

8. The transmitter of claim 7 further comprising a 1×(M+ 1) splitter having one input port and (M+1) output ports, wherein the input port is coupled to the pulsed light source, each of respective M output ports of the splitter are coupled to corresponding ones of the M delay lines, the Mth delay line having a delay of (M−1) time slots, and wherein the (M+1)th output port of the splitter is coupled to the dispersive delay line.

9. The transmitter of claim 8 further including an (M+1)×(M+1) combiner for combining the outputs of the M delay lines and the dispersive delay line to provide a composite signal.

10. The transmitter of claim 9 further including a modulator for modulating the composite signal to provide a plurality of WDM channels and a common broadcast channel.

11. The transmitter of claim 10 wherein the plurality of WDM channels are provided from the output of the dispersive delay line and the common broadcast channel is provided by combining the outputs of the M delay lines.

12. A method of providing a common broadcast channel in a wavelength division multiplexed (WDM) system, the method comprising the steps of:
　(a) during a first duration of time, applying output signals from a pulsed light source to a dispersive delay line to generate a wide-spectrum signal for providing a plurality of WDM channels, and
　(b) during a second duration of time, applying output signals from the pulsed light source to M delay lines, such that the Mth delay line has a delay of (M−1) time slots, where M is a nonnegative integer representing the number of time slots to be provided for the broadcast channel, the M delay lines generating delayed pulses for providing the common broadcast channel.

13. The method of claim 12 further comprising the step of using a combiner to interleave the wide-spectrum signal and the delayed pulses.

* * * * *

UNITED STATES PATENT AND TRADEMARK OFFICE
CERTIFICATE OF CORRECTION

PATENT NO.   : 6,028,685
DATED        : February 22, 2000
INVENTOR(S) : Elisa A. Cardi Jason Blain Stark John Lehrer Zyskind It is certified that error appears in the above-identified patent and that said Letters Patent is hereby corrected as shown below:

<u>Column 1,</u>
Line 3, after the title insert -- ACKNOWLEDGEMENT OF GOVERNMENTAL RIGHTS --

This invention was made with Government support under Agreement No.MDA 972-94-3-0036 awarded by ARPA. The Government has certain rights in the invention.

Signed and Sealed this

Twenty-seventh Day of November, 2001

Attest:

*Nicholas P. Godici*

NICHOLAS P. GODICI
*Attesting Officer*     *Acting Director of the United States Patent and Trademark Office*